(12) United States Patent
Hirai

(10) Patent No.: US 8,179,538 B2
(45) Date of Patent: May 15, 2012

(54) IMAGE PROCESSING APPARATUS, INFORMATION PROCESSING APPARATUS AND CONTROL METHOD

(75) Inventor: Nobuyuki Hirai, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1116 days.

(21) Appl. No.: 11/463,807

(22) Filed: Aug. 10, 2006

(65) Prior Publication Data
US 2007/0046972 A1 Mar. 1, 2007

(30) Foreign Application Priority Data
Aug. 31, 2005 (JP) .................................. 2005-252730

(51) Int. Cl.
*G06F 3/12* (2006.01)
*H04N 1/00* (2006.01)
*H04N 1/40* (2006.01)
*H04N 1/04* (2006.01)

(52) U.S. Cl. ........ 358/1.13; 358/401; 358/448; 358/476

(58) Field of Classification Search .................. 358/1.13, 358/1.9, 527, 448, 508, 401, 474, 476; 717/100; D18/50; D14/358, 357, 435.1
See application file for complete search history.

(56) References Cited

U.S. PATENT DOCUMENTS

| 5,924,802 | A | 7/1999 | Sakurai |
| 6,210,051 | B1 | 4/2001 | Sakurai |
| 2003/0093768 | A1 * | 5/2003 | Suzuki ........................... 717/100 |
| 2003/0123074 | A1 * | 7/2003 | Imai et al. ...................... 358/1.9 |

FOREIGN PATENT DOCUMENTS

| EP | 1508854 A2 * | 9/2004 |
| JP | 09-267538 A | 10/1997 |
| JP | 2003-216378 A | 7/2003 |
| JP | 2004-310154 A | 11/2004 |
| JP | 2005-184360 A | 7/2005 |

* cited by examiner

Primary Examiner — Benny Q Tieu
Assistant Examiner — Ngon Nguyen
(74) Attorney, Agent, or Firm — Canon U.S.A., Inc. IP Division

(57) ABSTRACT

An image processing apparatus is capable of executing a plurality of image processing functions and storing plural pieces of identifier information. Each respective piece of identifier information corresponds to each respective one of the plurality of image processing functions. The image processing apparatus sets one or more of the plural pieces of identifier information selected from the plural pieces of identifier information corresponding to the plurality of image processing functions. In response to receiving of a request to acquire the identifier information from an information processing apparatus, the image processing apparatus transmits the one or more of the plural pieces of identifier information set to the information processing apparatus.

16 Claims, 10 Drawing Sheets

SELECTION OF PRINTER LANGUAGE

■ PRINTER LANGUAGE A
■ PRINTER LANGUAGE B
■ FAX

[ OK ]  [ CANCEL ]

SELECTION OF PRINTER LANGUAGE

☐ PRINTER LANGUAGE A
■ PRINTER LANGUAGE B
☐ FAX

[ OK ]  [ CANCEL ]

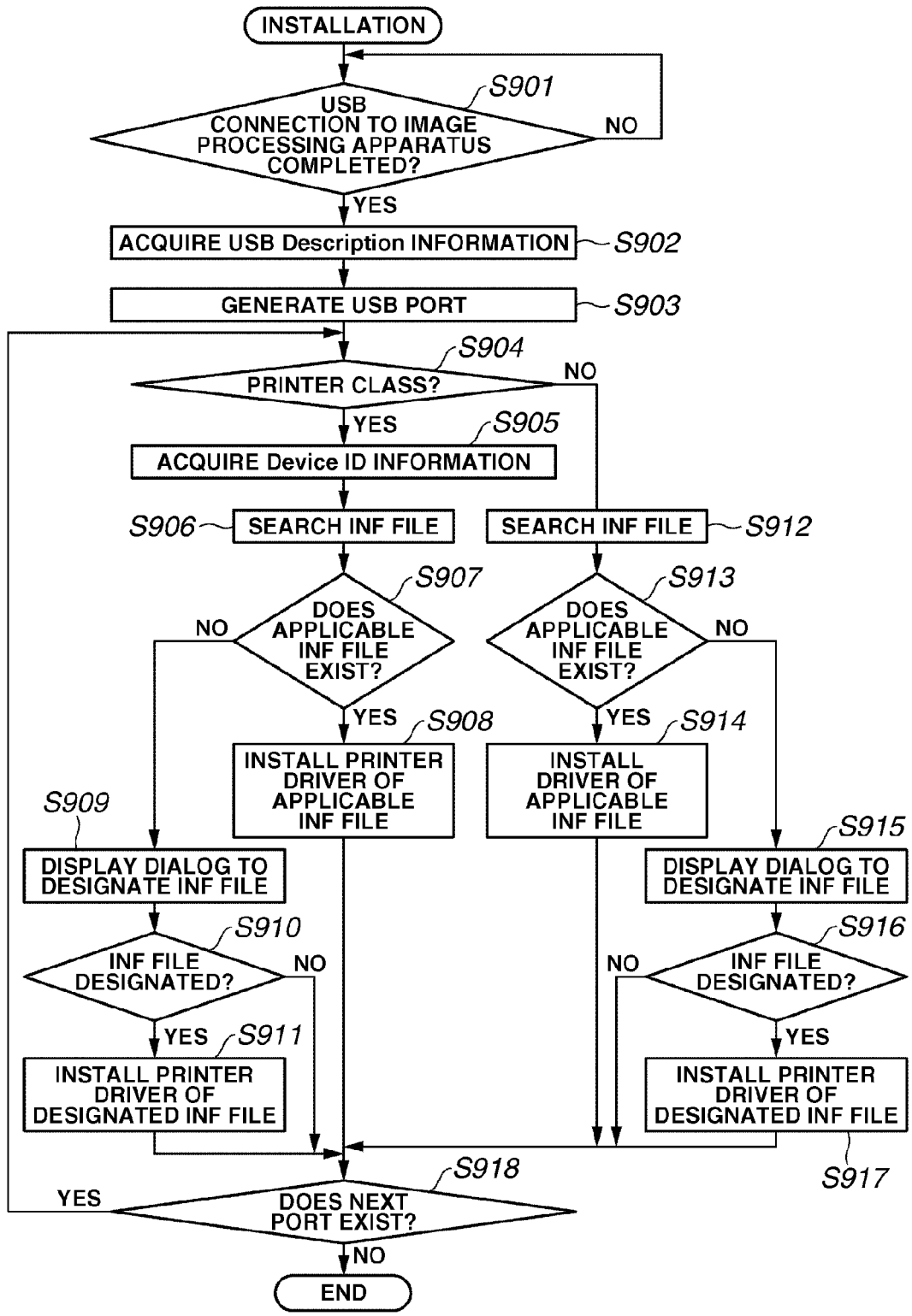

IMAGE PROCESSING APPARATUS, INFORMATION PROCESSING APPARATUS AND CONTROL METHOD

BACKGROUND OF THE INVENTION

1. Field of the Invention

The present invention relates to an image processing apparatus, an information processing apparatus and an image processing system. In particular, the present invention is suitably used for executing image processing.

2. Description of the Related Art

Conventionally, an image processing apparatus, which supports a plurality of printer languages such as PCL (Printer Control Language) and PostScript within one apparatus, has been known. In such an image processing apparatus, a command has an attribute of the printer language to support the plurality of printer languages with the same interface.

Further, Windows (registered trademarks) that is the OS (Operating System) of Microsoft Corporation, includes a function of automatically detecting a type of the image processing apparatus connected to an information processing apparatus (PC) and searching to install a printer driver corresponding to the type thereof. Such a function is referred to as Plug and Play. By this Plug and Play, the information processing apparatus (PC) acquires a device ID from the image processing apparatus so that the printer driver corresponding to the acquired device ID can be installed.

In the case where such a method is utilized, a technique is proposed (Japanese Patent Application Laid-Open No. 2003-216378) in which a printer driver to be installed by the Plug and Play can be selected on the side of the information processing apparatus (PC) when a plurality of printer drivers can be used with respect to one device ID. Further, a technique is proposed (Japanese Patent Application Laid-Open No. 9-267538) in which, when an extension device is newly mounted, a device ID corresponding to the mounted extension device is issued from the image processing apparatus to the information processing apparatus (PC).

However, in the image processing apparatus that supports the above-described plurality of printer languages, the plurality of printer drivers correspond to one device ID. Therefore, when the image processing apparatus and the information processing apparatus (PC) are connected to each other through a USB (Universal Serial Bus), the Plug and Play arises only once. Accordingly, it has been necessary to provide a special installer in the case where a user wishes to use a plurality of printer languages or to select a printer language that the user prefers.

Accordingly in recent years, a technique referred to as a "USB Composite" has been discussed with respect to the image processing apparatus such as a multiple function processing machine having a plurality of functions (printer, scanner, PC and FAX). The "USB Composite" separates a logical USB interface into each function. In this technique, when the image processing apparatus and the information processing apparatus (PC) are connected to each other through the USB, the Plug and Play arises corresponding to the number of functions included in the image processing apparatus. Accordingly, even if the image processing apparatus has the plurality of functions, the printer drivers corresponding to all functions can be installed in the information processing apparatus (PC) only by the Plug and Play.

However, when the "USB Composite" is applied to the image processing apparatus that supports the above-described plurality of printer languages, a plurality of printer drivers corresponding to the printer languages are automatically installed. As a result, even unnecessary printer drivers, which are not intended for use by a user, are automatically installed into the information processing apparatus (PC) contrary to the user's wishes. For example, when the user deletes the printer driver which the user does not intend to use, a problem can appear in that the Plug and Play may be performed every time the information processing apparatus (PC) and the image processing apparatus are reconnected through the USB or the information processing apparatus is restarted.

SUMMARY OF THE INVENTION

An embodiment of the present invention has been made in consideration of such a problem, and is directed to setting only a necessary function in an information processing apparatus from a plurality of functions included in an image processing apparatus.

According to an aspect of the present invention, an image processing apparatus has a plurality of functions to execute image processing and stores plural pieces of identifier information. Each respective piece of identifier information corresponds to each respective one of the plurality of functions. The image processing apparatus includes a setting unit, a reception unit and a transmission unit. The setting unit sets one or more of the plural pieces of identifier information selected from the plural pieces of identifier information corresponding to the plurality of functions. The reception unit receives a request to acquire the identifier information from an information processing apparatus. In response to receiving of the request to acquire the identifier information, the transmission unit transmits one or more of the plural pieces of identifier information set by the setting unit to the information processing apparatus.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIGS. 4A and 4B are diagrams showing a selection screen of a printer language displayed on a display section of an image processing apparatus according to an exemplary embodiment.

FIG. 9 is a flowchart for illustrating processing inn an information processing terminal when a driver is installed according to an exemplary embodiment.

DETAILED DESCRIPTION OF THE EMBODIMENTS

Exemplary embodiments of the present invention will be described with reference to the drawings.

Figure 1:
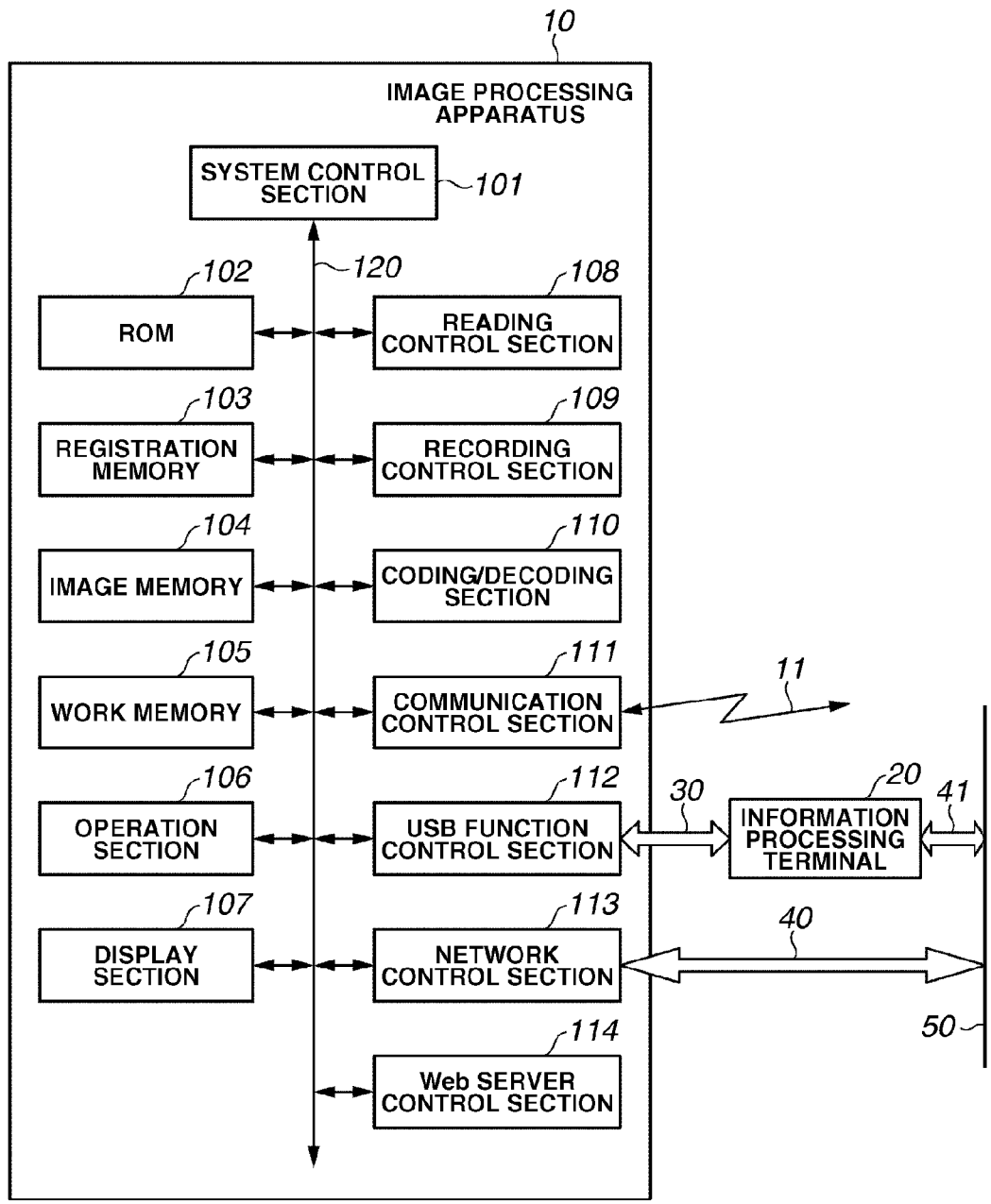
FIG. 1 is a block diagram showing a basic configuration of an image processing apparatus according to an exemplary embodiment of the present invention.

FIG. 1 is a block diagram showing one example of a basic configuration of an image processing apparatus 10. In FIG. 1, a system control section 101 controls operation of the image processing apparatus 10 through a system bus 120. This system control section 101 can be realized, for example, using a CPU.

A ROM 102 stores a control program that is executed by the system control section 101. A registration memory 103 is configured of a battery-backup SRAM (Static Random Access Memory), a flash memory or the like. The registration memory 103 stores a setting value registered by a user and control data for the image processing apparatus 10. An image memory 104 is configured of a DRAM (Dynamic Random Access Memory) or the like. The image memory 104 accumulates image data. A work memory 105 is configured of the DRAM or the like. The work memory 105 stores a program control variable.

An operation section 106 is configured of various kinds of input keys. Through the operation section 106, a user is able to carry out various inputs. A display section 107 is configured of an LCD (Liquid Crystal Display), an LED (Light Emitting Diode) or the like. The display section 107 is capable of various displays and a phonetic display.

A reading control section 108 is configured of an image sensor such as a CCD (Charge Coupled Device) or a CMOS (Complementary Metal Oxide Semiconductor), an image processing control section and the like. This reading control section 108 optically reads a document and converts the read document into electric image data. The reading control section 108 performs various kinds of image processing to these image data such as color processing, binary processing and halftone processing. Thus, the reading control section 108 generates and outputs high-precision image data. The reading control section 108 supports either or both of an ADF method and a platen method. The ADF method reads a document on an ADF (Auto Document Feeder) while the document is conveyed one by one. The platen method reads a document placed on a platen while the document stands still.

A recording control section 109 is configured by a printer such as a thermal printer, a laser printer or an ink jet printer, an image processing control section and the like. This recording control section 109 performs various kinds of image processing such as smoothing processing and recording density correction processing on the recording image data in order to convert it into high-precision image data. The recording control section 109 outputs these image data onto a recording sheet. In the present exemplary embodiment, the recording control section 109 supports a plurality of printer languages.

A coding/decoding section 110 codes raw image data (for example, MH compression, MR compression, MMR compression, JBIG compression or JPEG compression). Further, the coding/decoding section 110 decodes the coded image data into the raw image data.

A communication control section 111 is configured by a modem, an NCU (Network Control Unit) or the like. The communication control section 111 exchanges the image data with an information processing terminal that is the party on the other end of a communication line 11. A USB interface 30 conforms to USB communication standards. A USB logical interface of the USB interface 30 is separated into each of the printer languages. A USB function control section 112 controls the communication of the USB interface 30. This USB function control section 112 executes protocol control in accordance with the USB communication standards. The USB function control section 112 converts the data, which are executed by the system control section 101 and transmitted from a USB control task, into a USB packet. The USB function control section 112 transmits the USB packet to an external information processing terminal. Conversely, the USB function control section 112 converts the USB packet transmitted from the external information processing terminal into data to output to the system control section 101. With respect to transmission and reception of various kinds of control commands and data as above described, publicly known methods can be used. Accordingly, their details will not be described.

A network control section 113 communicates with an external terminal such as an information processing terminal 20 connected to the image processing apparatus 10 through a network interface 40 and a network 50. With respect to a communication control method, a publicly known method can be used. Accordingly, its details will not be described. A Web server control section 114 creates an HTML file about a state of the image processing apparatus 10, a state of various jobs and a user registration screen. The Web server control section 114 responds to a browse request from the information processing terminal 20 having a browser, through the network 50, and provides the information processing terminal 20 with a page based on the HTML file.

Figure 2:
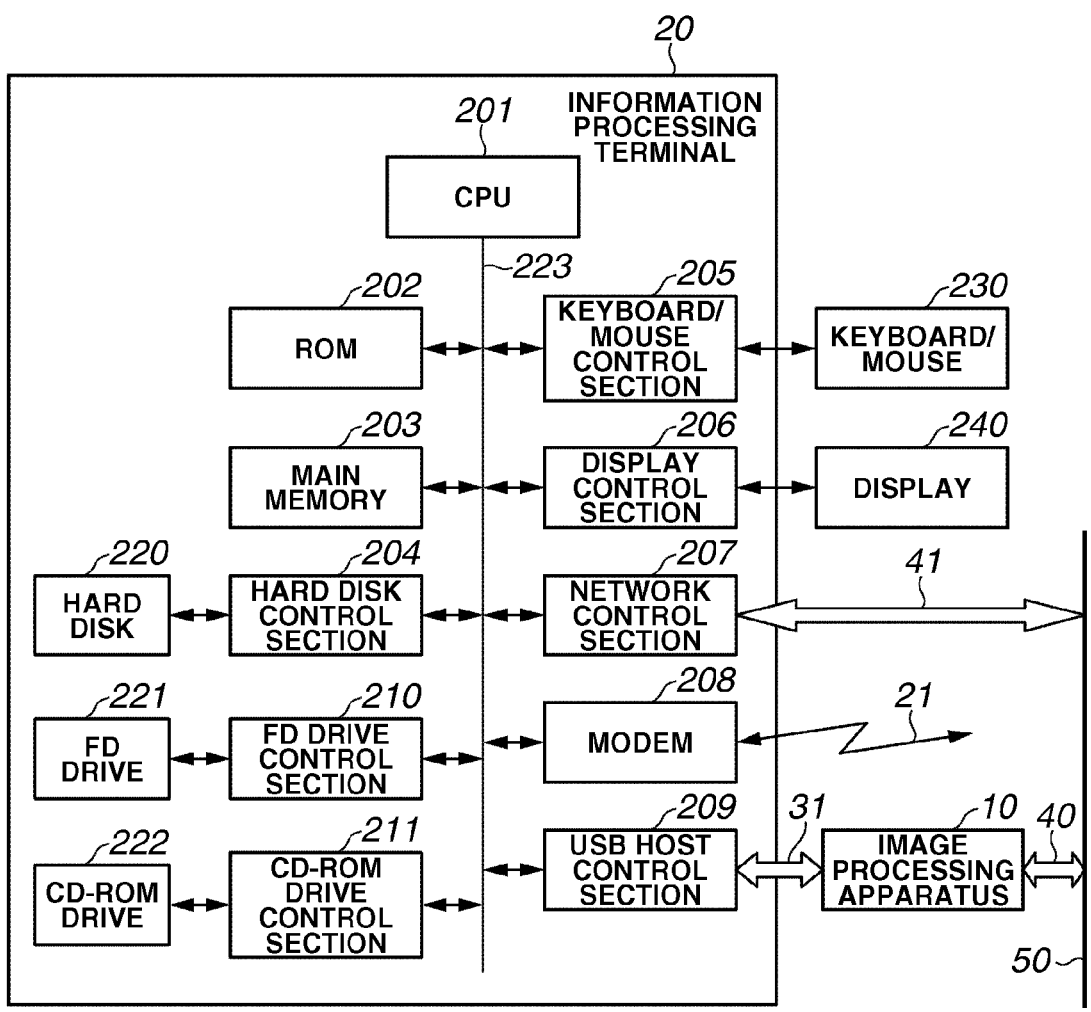
FIG. 2 is a block diagram showing a basic configuration of an information processing terminal according to an exemplary embodiment.

FIG. 2 is a block diagram showing a basic configuration of the information processing terminal 20 according to an exemplary embodiment of the present invention. In FIG. 2, a CPU 201 reads a control program stored in a storage medium. In accordance with the read program, the CPU 201 controls operation of the information processing terminal through a system bus 223. This control program is stored in, for example, a ROM 202, a main memory 203, a hard disk 220, an FD (Flexible Disk) drive 221 or a CD-ROM drive 222. The ROM 202 stores a control program to be executed by the CPU 201. The main memory 203 temporarily stores a control program and image data to perform high-speed operation of processing of the information processing terminal 20.

A hard disk control section 204 controls the hard disk 220 in which an OS (Operating System), various kinds of application programs and image data are stored. In the hard disk 220, application software and driver software for executing transmission and reception of various control commands and data to and from the image processing apparatus 10 are installed.

These application software and driver software are normally installed into the hard disk 220 from other computer-readable storage mediums which store them, through the FD drive 221 or the CD-ROM drive 222. Further, it is also possible to download the application software and the driver software through a network control section 207 and a modem 208, and to install them in the hard disk 220.

A keyboard/mouse control section 205 controls a keyboard/mouse 230 serving as an instruction input unit of a user. A display control section 206 controls a display 240 that performs various displays. The network control section 207 performs control for connecting to the network 50 through a network interface 41. With respect to connection to the network 50 by the network control section 207, a publicly known method is used and its details will not be described.

The modem 208 performs connection to a provider through a communication line 21. The modem 208 communicates data and image information between the modem 208 and an information processing apparatus that is the party on the other end of communication line 21. A USB host control section 209 executes the communication control of a USB interface 31. This USB host control section 209 converts data from the CPU 201 into a USB packet in accordance with the USB communication standards and transmit it to the image processing apparatus 10. Conversely, the USB host control section 209 converts the USB packet transmitted from the image processing apparatus 10 into data and outputs it to the CPU 201. With respect to these communication control methods, a publicly known method can be used. Accordingly, their description will be omitted. An FD drive control section 210 controls the FD drive 221. A CD-ROM drive control section 211 controls the CD-ROM drive 222.

Figure 3:
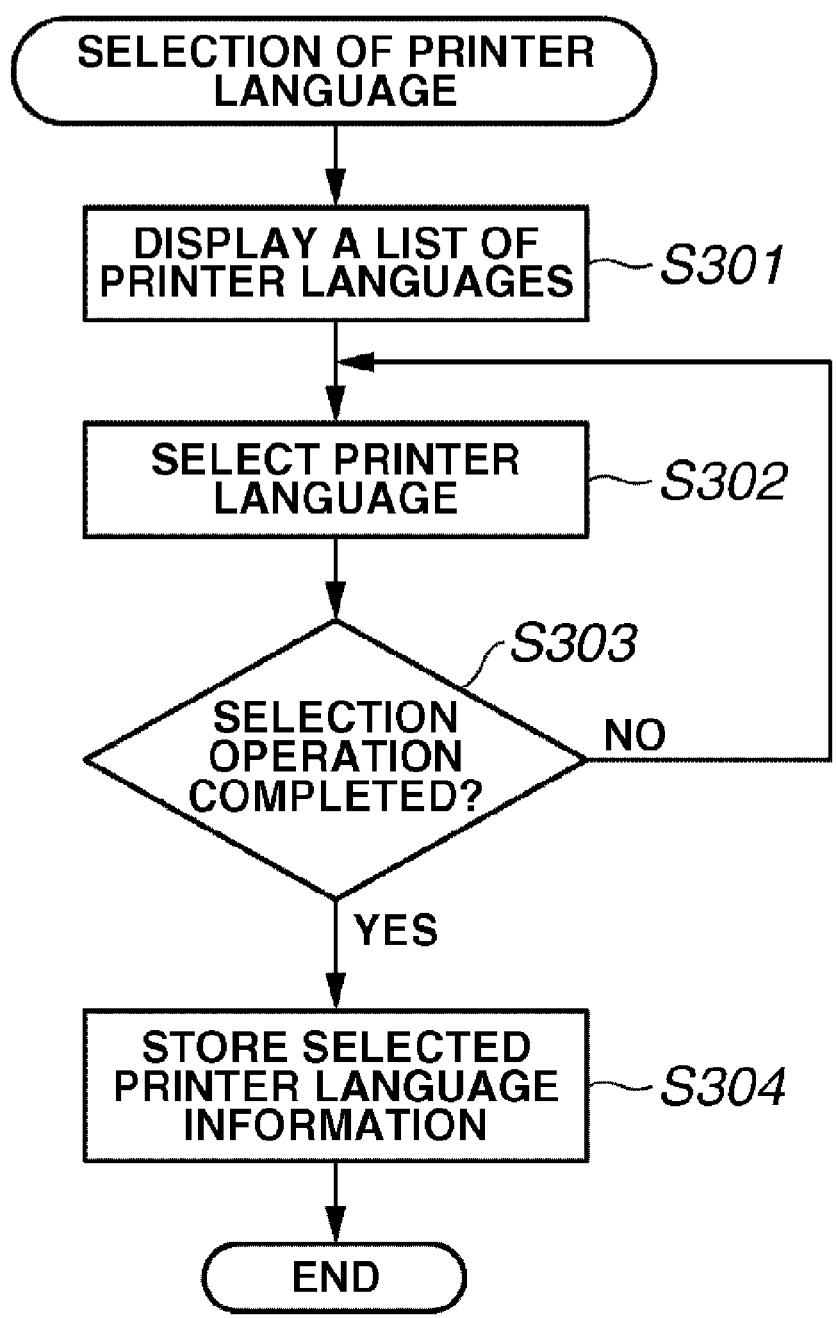
FIG. 3 is a flowchart for illustrating processing in an image processing apparatus when a printer language is selected according to an exemplary embodiment.

FIG. 3 is a flowchart for illustrating one example of processing in the image processing apparatus 10 when a printer language is selected. First, in step S301, the system control section 101 displays, on the display section 107, a list of printer languages which the image processing apparatus 10 supports. At this time, the system control section 101 reads from the registration memory 103 the printer language which is currently selected. The system control section 101 displays information showing which printer language is selected on the display section 107 together with a list of printer languages. A display example at this stage will be described later with reference to FIG. 4.

Next, in step S302, the system control section 101 selects a printer language, which is selected by a user, based on user inputs received via the operation section 106. Then, in step S303, the system control section 101 determines whether the selection of the printer language is completed. The system control section 101 repeats the processing of the steps S302 and S303 until the selection of the printer language is completed. When the selection of the printer language is thus completed, in step S304, the system control section 101 stores printer language information associated with the selected printer language in the registration memory 103. Then, the processing ends.

FIGS. 4A and 4B are diagrams showing one example of a selection screen of a printer language displayed on the display section 107 of the image processing apparatus 10 in the step S301 shown in FIG. 3. To facilitate a thorough understanding of the present exemplary embodiment, suppose that the image processing apparatus 10 in the present example supports three kinds of printer languages, that is, a printer language A, a printer language B and a FAX. A selection screen 401 of the printer languages shown in FIG. 4A is a display example when the all of the three kinds of printer languages are selected. On the other hand, a selection screen 402 of the printer languages shown in FIG. 4B is a display example when only the printer language B is selected from among the three kinds of printer languages.

In the selection screen 401 of the printer languages shown in FIG. 4A, a user can operate the operation section 106 to check or uncheck each respective check box. Thus, the user can designate one or more printer languages and the system control section 101 selects the printer language(s) which is checked in the check box, from among the three kinds of printer languages.

After the printer language is thus selected, the user operates the operation section 106 to click an OK button. The system control section 101 determines that the selection operation is completed. Then, the printer language which is checked in the check box, is stored in the registration memory 103. Further, if the image processing apparatus 10 is not used as a printer or a FAX, it is also possible to remove checks from all three check boxes and to register a state in which no printer language is selected.

Figure 5:
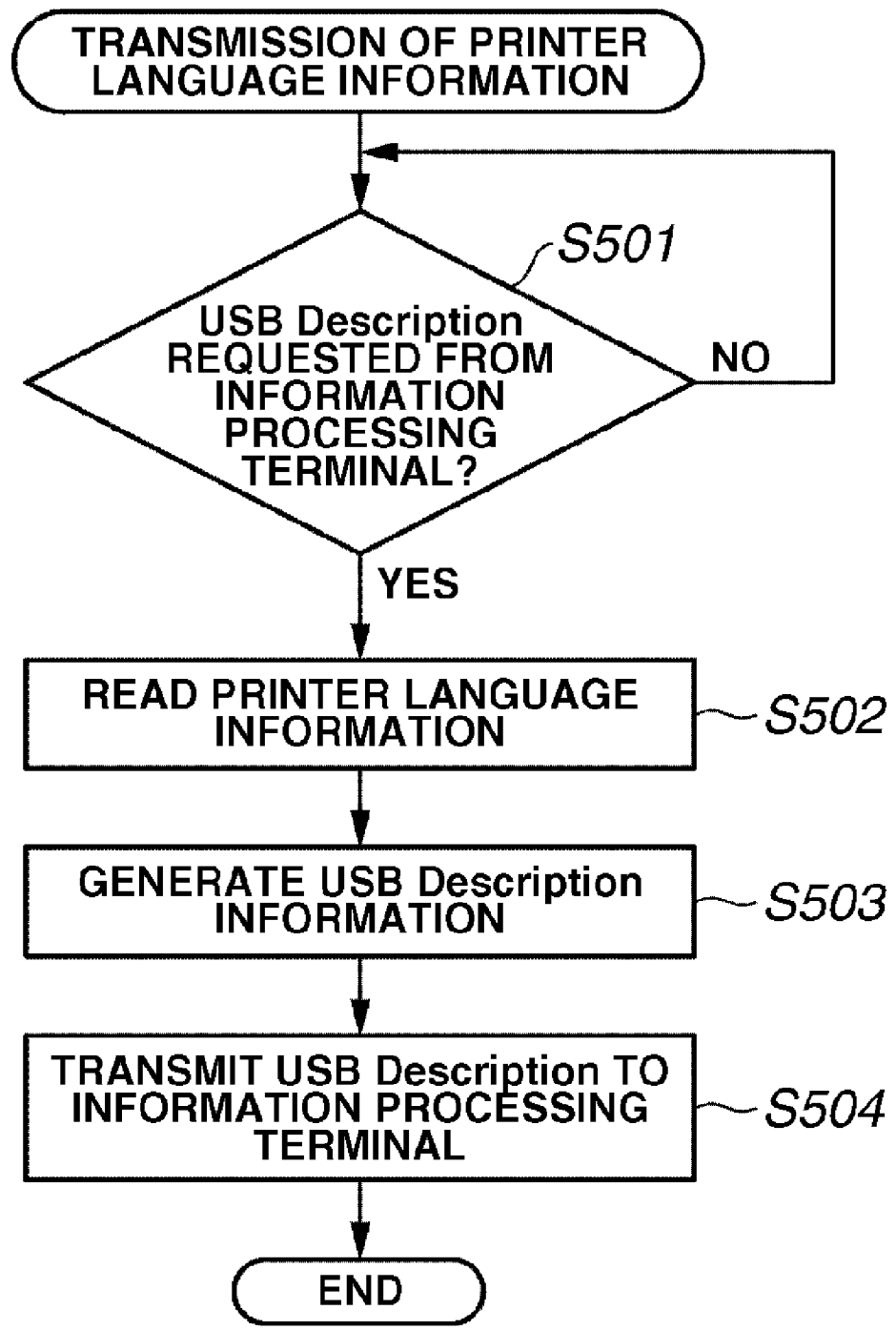
FIG. 5 is a flowchart for illustrating processing in an image processing apparatus when a selected printer language is transmitted to an information processing terminal according to an exemplary embodiment.

FIG. 5 is a flowchart for illustrating one example of processing in the image processing apparatus 10 when the selected printer language is transmitted to the information processing terminal 20. First, in step S501, the USB function control section 112 waits until a "USB Description request" is received from the information processing terminal 20. If the "USB Description request" is received ("Yes" in step S501), the process proceeds to step S502 where the system control section 101 reads the printer language information stored in the registration memory 103 in the step S304 of FIG. 3.

Next, in step S503, the system control section 101 executes a USB control task to create "USB Description information" (shown at FIG. 6 or FIG. 7) based on the read printer language information. Subsequently, in step S504, the USB function control section 112 converts the "USB Description information" created in the step S503 into a USB packet. The USB function control section 112 transmits to the information processing terminal 20 the "USB Description information" that is converted into the USB packet. The "USB Description information" will be described later using FIGS. 6 and 7.

As described above, in the present exemplary embodiment, a list of printer languages that the image processing apparatus 10 supports is displayed on the selection screens 401 and 402 so that a user can designate a printer language. Then, when the Plug and Play is executed, only one or more of plural pieces of "USB Description information" (USB Description information of a printer class includes device ID character string for printer class) corresponding to the printer language designated by the user is transmitted to the information processing terminal 20. On the other hand, the "USB Description information" (device ID character string) corresponding to the printer language not designated by the user is not transmitted.

Figure 6:
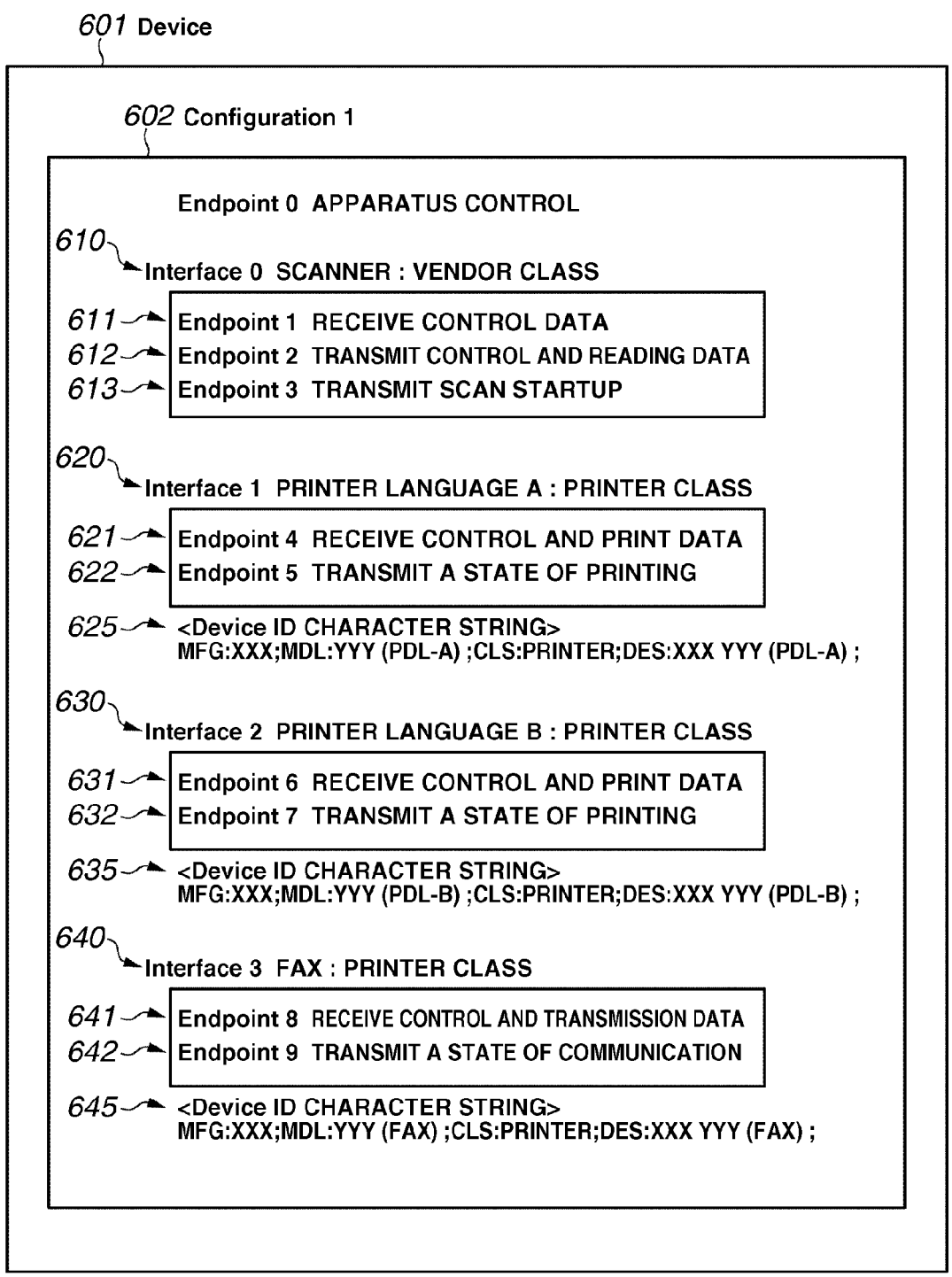
FIG. 6 is a diagram conceptually showing a configuration of a USB function control section when three kinds of printer languages are all selected according to an exemplary embodiment.

FIG. 6 is a diagram conceptually showing one example of a configuration of the USB function control section 112 when all of the above-described three kinds of printer languages are selected as shown in FIG. 4A. In FIG. 6, only one Device 601 shown by the largest frame can be defined according to the USB communication standards. The Device 601 indicates an attribute of the whole image processing apparatus 10. The attribute of the Device 601 is expressed by a Device Descriptor. This Device Descriptor includes a Vendor ID, a Product ID, a release number and the number of Configurations of the image processing apparatus 10. In the present exemplary embodiment, the number of Configurations is given by "1".

In the Device 601, only one Configuration 602 is defined (Configuration 1). An attribute of the Configuration 602 is expressed by a Configuration Descriptor. The Configuration Descriptor includes the number of Interfaces present in the Configuration. In the present exemplary embodiment, the number of Interfaces is given by "4".

In the Configuration 602, four Interfaces [Interfaces 610, 620, 630 and 640 (Interface 0 to 3)] are defined. An attribute of these Interfaces 610, 620, 630 and 640 is expressed by an Interface Descriptor. The Interface Descriptor includes the number of Endpoints present in the Interface, and a class code. In the present exemplary embodiment, the number of Endpoints present in the Interface 610 (Interface 0) which is used for a scanner, is given by "3" and the class code is a vendor class (OxFF).

Further, the number of Endpoints present in the Interface 620 (Interface 1) which is used for the printer language A, is given by "2". The class code is a printer class (OxO7). Furthermore, the number of Endpoints present in the Interface 630 (Interface 2) which is used for the printer language B, is given by "2" and the class code is the printer class (OxO7). Further, the number of Endpoints present in the Interface 640 (Interface 3) which is used for transmission and reception of a FAX, is given by "2" and the class code is the printer class (Ox7).

In the Interface 610 (Interface 0) to be used for the scanner, only three Endpoints [Endpoints 611, 612 and 613 (Endpoints 1, 2 and 3)] are defined. An attribute of these Endpoints 611, 612 and 613 (Endpoints 1, 2 and 3) is expressed by an Endpoint Descriptor. This Endpoint Descriptor includes an Endpoint number, a communication direction, a transfer type and a packet size of the Endpoint.

The Endpoint 611 (Endpoint 1) is principally used for receiving control data. The Endpoint 612 (Endpoint 2) is principally used for transmitting control data and read data. The Endpoint 613 (Endpoint 3) is principally used for notifying that a start of a scan is commanded from the image processing apparatus 10. In the Interface 620 (Interface 1) to be used for the printer language A, only two Endpoints [Endpoints 621 and 622 (Endpoints 4 and 5)] are defined. An attribute of these Endpoints 621 and 622 (Endpoints 4 and 5) is expressed by the Endpoint Descriptor. The Endpoint Descriptor includes an Endpoint number, a communication direction, a transfer type and a packet size of the Endpoint.

The Endpoint 621 (Endpoint 4) is principally used for receiving control data and print data. The Endpoint 622 (Endpoint 5) is principally used for transmitting a state of printing of the received print data. Further, a Device ID character string 625 is identifier information for the printer language A. The Device ID character string 625 includes an MFG that indicates a company name, an MDL that indicates a model name, a CLS that indicates a class and a DES that indicates display information. In the present exemplary embodiment, the CLS is a "PRINTER" that represents the printer class. Such information is transmitted to the information processing terminal 20 so that the information processing terminal 20 can determine which driver should be installed, as will be described later.

In the Interface 630 (Interface 2) to be used for the printer language B, only two Endpoints [Endpoints 631 and 632 (Endpoint 6 and 7)] are defined. An attribute of these Endpoints 631 and 632 (Endpoint 6 and 7) is expressed by the Endpoint Descriptor. This Endpoint Descriptor includes an Endpoint number, a communication direction, a transfer type and a packet size of the Endpoint.

The Endpoint 631 (Endpoint 6) is principally used for receiving control data and print data. The Endpoint 632 (Endpoint 7) is principally used for transmitting a state of printing of the received print data. Further, a Device ID character string 635 is identifier information for the printer language B. In the Interface 640 (Interface 3) to be used for transmitting a FAX, only two Endpoints [Endpoints 641 and 642 (Endpoint 8 and 9)]are defined. An attribute of these Endpoints 641 and 642 (Endpoint 8 and 9) is expressed by the Endpoint Descriptor. The Endpoint Descriptor includes an Endpoint number, a communication direction, a transfer type and a packet size of the Endpoint.

The Endpoint 641 (Endpoint 8) is principally used for receiving control data and transmission data of a FAX. The Endpoint 642 (Endpoint 9) is principally used for transmitting a state of communication of the transmission data of a FAX. A Device ID character string 645 is identifier information for a FAX. In these configurations, when the image processing apparatus 10 is connected for the first time, the information processing terminal 20 can install necessary drivers, performing the function called as the Plug and Play supported by Windows (registered trademarks). Further, the information processing terminal 20 can realize a function such as print, scanning and FAX in the image processing apparatus 10 using the installed drivers. The details of installation of the drivers will be described later using FIGS. 8 and 9.

Figure 7:
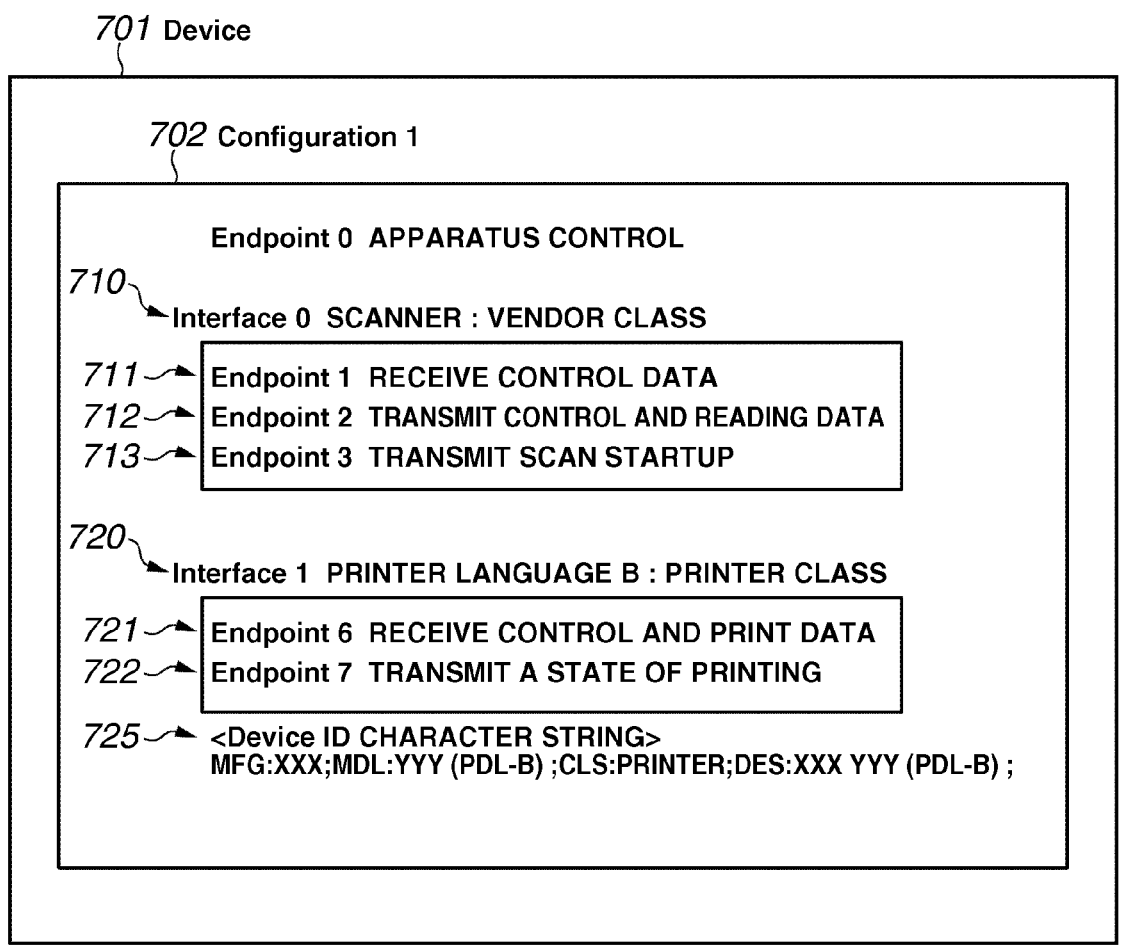
FIG. 7 is a diagram conceptually showing a configuration of a USB function control section when only a printer language B is selected among three kinds of printer languages according to an exemplary embodiment.

FIG. 7 is a diagram conceptually showing one example of a configuration of the USB function control section 112 when only the printer language B is selected from among the above-described three kinds of printer languages shown in FIG. 4B. In FIG. 7, only one Device 701 shown by the largest frame can be defined according to the USB communication standards. The Device 701 indicates an attribute of the whole image processing apparatus 10. The attribute of the Device 701 is expressed by the Device Descriptor. The Device Descriptor includes a Vendor ID, a Product ID, a release number and the number of Configurations. In the present exemplary embodiment, the number of Configurations is given by "1".

In the Device 701, only one Configuration 702 (Configuration 1) is defined. An attribute of the Configuration 702 is expressed by the Configuration Descriptor. The Configuration Descriptor includes the number of Interfaces present in the Configuration. In the present exemplary embodiment, the number of Interfaces is given by "2".

In the Configuration 702 (Configuration 1), two Interfaces [Interfaces 710 and 720 (Interfaces 0 and 1)] are defined. An attribute of the Interfaces 710 and 720 (Interfaces 0 and 1) is expressed by the Interface Descriptor. The Interface Descriptor includes the number of Endpoints in the Interface, and the class code.

In the present exemplary embodiment, the number of Endpoints in the Interfaces 710 (Interfaces 0) used for a scanner, is given by "3". The class code is the vendor class (OxFF). The number of Endpoints in the Interfaces 720 to be used for the printer language B, is given by "2". The class code is the printer class (OxO7). In the Interfaces 710 (Interfaces 0) used for the scanner, only three Endpoints [Endpoints 711, 712 and 713 (Endpoints 1, 2 and 3)] are defined. The details of these Endpoints 711, 712 and 713 (Endpoints 1, 2 and 3) are similar to the Endpoints 611, 612 and 613 described in FIG. 6.

In the Interfaces 720 (Interfaces 1) used for the printer language B, only two Endpoints [Endpoints 721, and 722 (Endpoints 6 and 7)] are defined. The details of these Endpoints 721, and 722 (Endpoints 6 and 7) are similar to the Endpoints 631 and 632 described in FIG. 6. Further, a Device ID character string 725 is identifier information for the printer language B. This identifier information is similar to the Device ID character string 635 described in FIG. 6.

Figure 8:
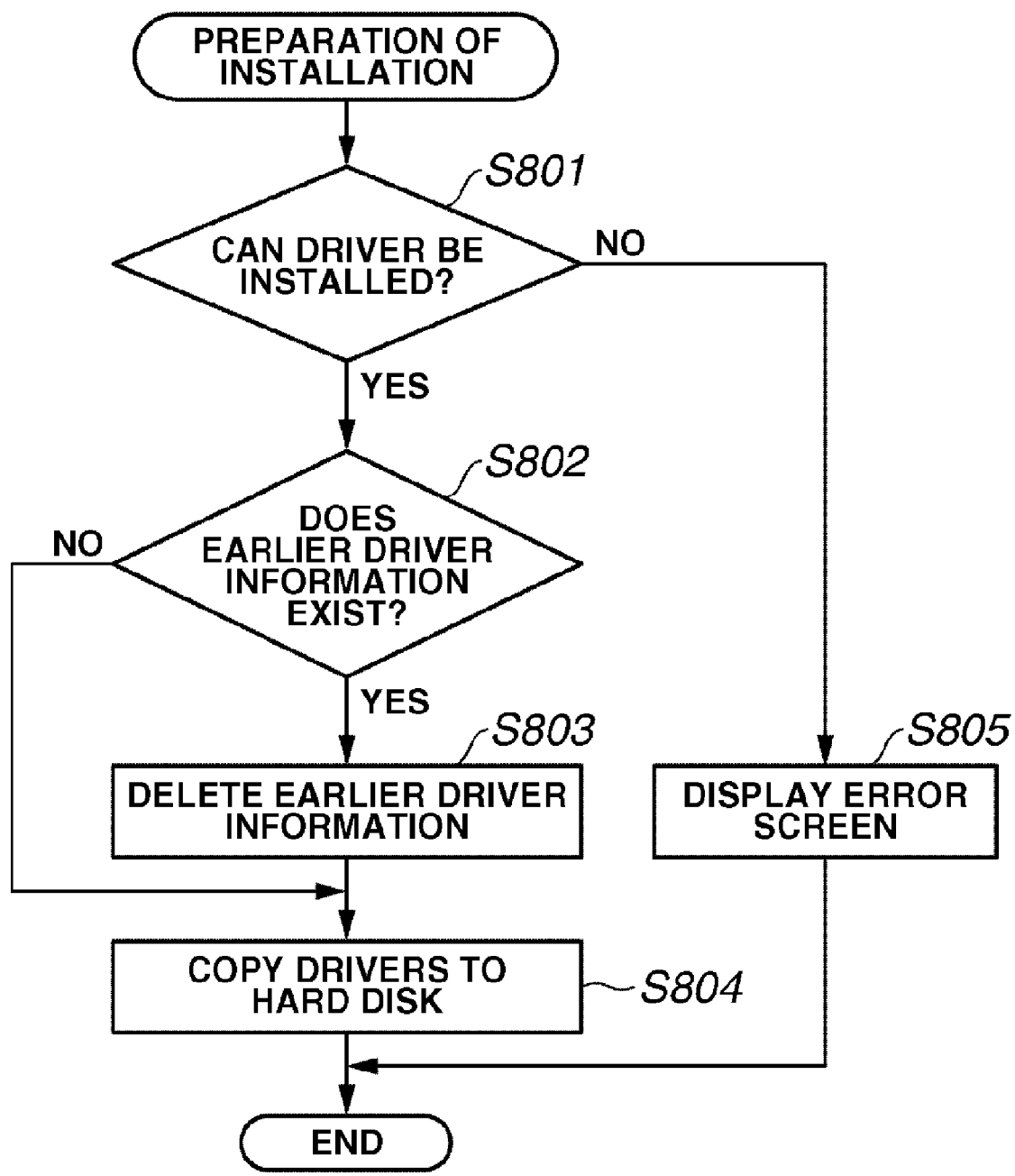
FIG. 8 is a flowchart for illustrating processing in an information processing terminal when a preparation for installing a driver is made according to an exemplary embodiment.

FIG. 8 is a flowchart for illustrating one example of processing in the information processing terminal 20 when a preparation for installing a driver is performed. Software (installer) to execute installation of the driver is normally provided from a storage medium such as a CD-ROM. This installer can be a program started by user operation. However, it is still more desirable that the program of the installer is automatically started when the CD-ROM storing the installer is mounted on the CD-ROM drive 222. Further, it is also possible to download the installer onto the hard disk 220 through the network control section 207 and the modem 208, and thereafter to start the downloaded installer.

The program of the installer is thus started. When a preparation for installing a driver is started, in step S801, the CPU 201 determines whether the driver can be installed. This determination is made, for example, by confirming a remaining capacity of the hard disk 220, a capacity of the main memory 203 and a kind of the OS installed in the information processing apparatus 20 by the CPU 201. As a result, if it is determined that the driver can not be installed ("No" in step S801), the processing proceeds to step S805 where the display control section 206 displays an error on the display 240 based on a control signal outputted from the CPU 201. Then, the processing ends.

On the other hand, if it is determined that the driver can be installed ("Yes" in step S801), the processing proceeds to step S802. In step S802, the CPU201 determines, for example, whether earlier stored driver information is present in a storage medium of the information processing terminal 20 such as the hard disk 220. As a result of this determination, if the earlier driver information is present ("Yes" in step S802), the processing proceeds to step S803 where the CPU 201 deletes the earlier driver information. The earlier driver information is deleted because, if the earlier driver information remains, there is a possibility that subsequent installation may not be properly operated. On the other hand, if the earlier driver information does not exist ("No" in step S802), the step s803 is omitted and the processing proceeds to step S804.

In step S804, the CPU 201 copies to the hard disk 220 drivers which are necessary for installation. The copy of the drivers to the hard disk 220 can be realized, for example, using an API (Application Program Interface) referred to as "SetupCopyOEMInf" if the OS is Windows (registered trademark). Further, among the drivers to be copied to the hard disk 220, there is an INF file. In the INF file for the printer language A, a character string which corresponds to the MFG and the MDL character strings in the Device ID character string 625 for the printer language A, and a file name that should be installed for the printer language A, are described.

Further, in the INF file for the printer language B, a character string which corresponds to the MFG and the MDL character strings in the Device ID character strings 635 and 725 for the printer language B, and a file name that should be installed for the printer language B, are described. Furthermore, in the INF file for a FAX, a character string which corresponds to the MFG and the MDL character strings in the Device ID character string 645 for the FAX, and a file name that should be installed for the FAX, are described.

As described above, the installer causes copying of a driver set to the hard disk 220 beforehand. In the driver set, a Device ID character string which is different according to each of the printer language, and a driver which realizes the printer language to be identified by the Device ID character string, are associated with each other. At this time, the installer causes copying of such a driver set to the hard disk 220 with respect to the entire printer language included in the image processing apparatus 10, and to keep drivers for all the printer languages included in the image processing apparatus 10 in advance. As shown in FIG. 9, when the information processing terminal 20 is connected to the image processing apparatus 10 through the USB, only the driver corresponding to the printer language which was selected using the selection screen shown in FIG. 4A is automatically installed in the information processing terminal 20 by the Plug and Play.

FIG. 9 is a flowchart illustrating one example of processing in the information processing terminal 20 when a driver is installed. First, in step S901, the CPU 201 waits until the connection of the image processing apparatus 10 is detected by the USB host control section 209. If the connection to the image processing apparatus 10 is detected in the step S901, the processing proceeds to step S902. In step S902, the CPU 201 instructs the USB host control section 209 by the Plug and Play to issue an acquisition command requesting configuration information in the image processing apparatus 10. The USB host control section 209 issues, for example, a Get_Device_Descriptor command, a Get_Configuration_Descriptor command and a Get_String_Descriptor command to the image processing apparatus 10. The USB host control section 209 acquires the configuration information (USB Description information) about the image processing apparatus 10 in a response to the acquisition command of the configuration information. By issuing the above-described commands from the information processing terminal 20 to the image processing apparatus 10, the information processing terminal 20 can acquire in turn various kinds of information shown in FIGS. 6 and 7.

In step S903, the CPU 201 generates a USB port corresponding to a Vendor ID and a Product ID of the image processing apparatus 10 included in the Device Descriptor, and each Interface number based on the information acquired in the step S902. In the case of the example shown in FIG. 6, USB ports are separately generated for the Interface 610 used for a scanner, the Interface 620 used for a printer language A, the Interface 630 used for a printer language B and the Interface 640 used for a FAX. As respective port information, a class code in the above-described Interface Descriptor is stored.

Further, in the case of the example shown in FIG. 7, USB ports are generated for an Interface 710 used for a scanner and an Interface 720 used for a printer language B. As respective port information, a class code in the above-described Interface Descriptor is stored. Next, in step S904, the CPU 201 determines whether the generated USB port is used for the printer class. As a result of this determination, if the generated USB port is used for the printer class ("Yes" in step S904), the processing proceeds to step S905 where the CPU 201 instructs the USB host control section 209 to issue a Get_Device_ID command. Then, the USB host control section 209 issues the Get_Device_ID command to the image processing apparatus 10. The USB host control section 209 acquires the Device ID character string (Device ID information) described in FIGS. 6 and 7 in a response to the Get_Device_ID command.

Next, in step S906, the CPU 201 compares the MFG and the MDL information in the Device USB Description information acquired in the step S902, and the MFG and the MDL information in various INF files copied to the hard disk 220 in the step S804. Then, the CPU 201 searches an INF file in which USB Description information conforms with the MFG and the MDL information. Subsequently, in step S907, the CPU 201 determines whether the INF file in which the Device ID character string conforms with the MFG and the MDL information, is present. As a result of this determination, if the INF file is present in which the Device ID character string conforms with the MFG and the MDL information ("Yes" in step S907), the processing proceeds to step S908 where the CPU 201 installs various kinds of driver files described in the INF file. Then, the processing proceeds to step S918. At this time, the CPU 201 generates an icon corresponding to the installed driver file.

On the other hand, in the step S907, if the INF file does not exist in which the Device ID character string conforms with the MFG and the MDL information ("No" in step S907), the processing proceeds to step S909 where the display control section 206 displays a dialog on the display 240 based on a control signal outputted from the CPU 201 so as to enable a user to designate the INF file.

Next, in step S910, the CPU 201 determines whether the user has designated the INF file in which the Device ID character string conforms with the MFG and the MDL information based on the result of operation of the keyboard/mouse 230 by the user. As a result of this determination, if the user has designated the INF file in which the Device ID character string conforms with the MFG and the MDL information ("Yes" in step S910), the processing proceeds to step S911 where the CPU 201 installs various kinds of driver files described in the INF file. Then, the processing proceeds to the step S918. The CPU 201 generates an icon corresponding to the installed driver file. On the other hand, if the user has not designated the INF file in which the Device ID character string conforms with the MFG and the MDL information ("No" in step S910), the step S911 is omitted and the processing proceeds to the step S918.

In step S904, if the generated USB port is not used for the printer class, the processing proceeds to step S912 where the CPU 201 searches the INF file by a method that conforms to the class of the generated USB port. For example, if the generated USB port is used for a scanner driver, it is determined whether the Vendor ID, the Product ID and the interface number for the scanner of the image processing apparatus 10 described in FIGS. 6 and 7 conforms to the Device ID character string acquired in the step S902 and various kinds of INF files copied to the hard disk 220 in the step S804.

Next, in step S913, it is determined whether the applicable INF file is present. For example, if the generated USB port is used for the scanner driver, it is determined whether an INF file is present in which the USB Description information acquired in the step S902 conforms to the Vendor ID, the Product ID and the interface number for the scanner. USB Description information corresponding to a scanner class includes the Vendor ID, the Product ID and the interface number for the scanner. As a result of this determination, if the applicable INF file is present ("Yes" in step S913), the processing proceeds to step S914 where the CPU 201 installs various kinds of driver files described in the applicable INF file. Then, the processing proceeds to the step S918. At this time, the CPU 201 generates an icon corresponding to the installed driver file.

On the other hand, in the step S913, if the applicable INF file does not exist, the processing proceeds to step S915 where the display control section 206 displays a dialog on the display 240 based on a control signal outputted from the CPU 201 so as to enable a user to designate the INF file.

Next, in step S916, the CPU 201 determines whether a user has designated the applicable INF file based on the result of operation of the keyboard/mouse 230 by the user. As a result of this determination, if the user has designated the applicable INF file ("Yes" in step S916), the processing proceeds to step S917 where the CPU 201 installs various kinds of driver files described in the applicable INF file. Then, the processing proceeds to the step S918. At this time, the CPU 201 generates an icon corresponding to the installed driver file. On the other hand, if the user has not designated the applicable INF file ("No" in step S916), the step S917 is omitted. The processing directly proceeds to the step S918.

In the step S918, the CPU 201 searches whether next new USB port is present. As a result of this search, if the next new USB port is present ("Yes" in step 918), the processing returns to the step S904. The steps S904 to S918 are repeated until the USB port does not exist. As described above, a suitable driver for each Interface is installed respectively.

Figure 10A:
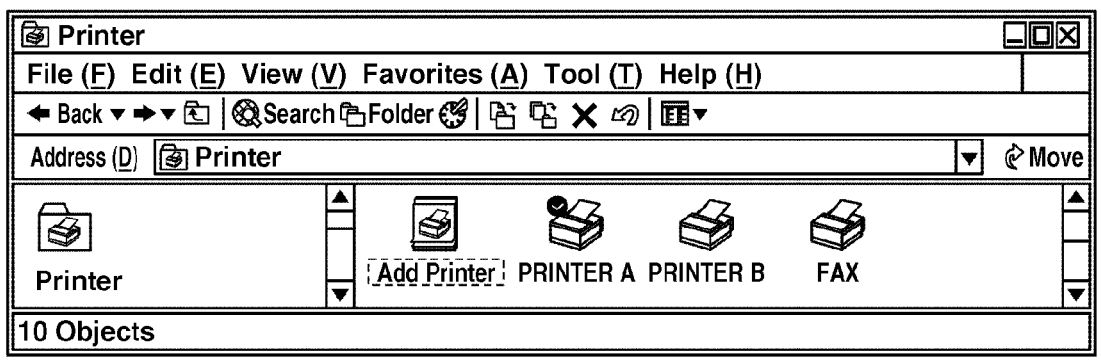
FIGS. 10A and 10B are diagrams showing display examples illustrating icons displayed on a display of an information processing terminal after drivers are installed according to an exemplary embodiment.
Figure 10B:
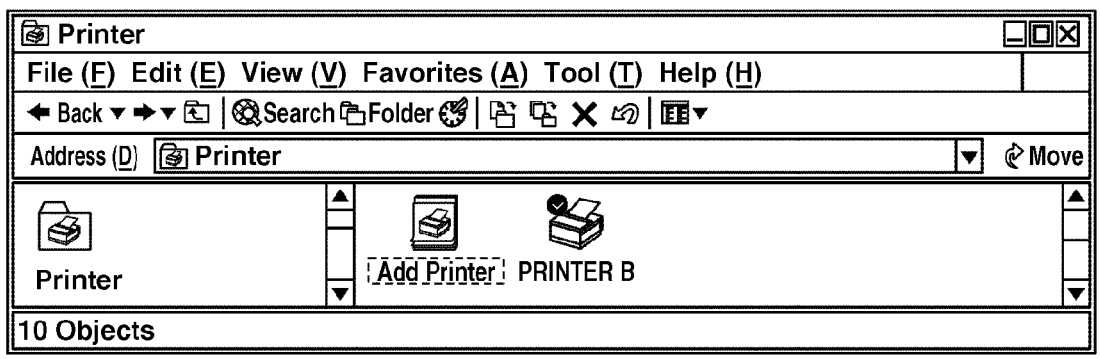

FIGS. 10A and 10B show exemplary screen shots illustrating icons which are displayed on the display 240 of the information processing terminal 20 after a driver was installed. FIG. 10A is a display example in the case where all of three kinds of printer languages are selected and the driver that supports the Device ID character string (Device ID) corresponding to the selected printer languages, is installed by the Plug and Play as shown in FIG. 4A. In this case, since there are three printer classes (refer to FIG. 6), the number of the printer icons is three. On the other hand, FIG. 10B is a display example in the case where one kind of printer languages is selected and the driver that supports the Device ID character string (Device ID) corresponding to the selected printer languages, is installed by the Plug and Play as shown in FIG. 4B. In this case, since there is one printer class (refer to FIG. 6), the number of the printer icons is one.

As described above, in the present exemplary embodiment, a list of printer languages, which are supported by the image processing apparatus 10, is displayed on the selection screens 401 and 402 of the printer language to enable a user to designate the printer language. On the other hand, the installer in the information processing apparatus 20 includes the driver set in which the Device ID character string is different according to the printer language, and drivers for all printer languages are copied to the hard disk 220 beforehand. When the information processing terminal 20 is connected to the image processing apparatus 10 through the USB, only the Device ID character string corresponding to the printer language designated by a user is transmitted from the image processing apparatus 10 to the information processing apparatus 20. Then, the driver corresponding to the Device ID character string is automatically installed in the information processing apparatus 20.

In the configuration described above, a plurality of printer languages can be selected by one operation and only the selected printer language(s) can be installed in the information processing apparatus 20. Further, when the information processing terminal 20 is restarted, unnecessary Plug and Play can be prevented. Thus, the function(s) of the image processing apparatus 10 can be selected according to an operating environment selected by a user. Furthermore, the information processing apparatus 20 copies drivers for all of the printer languages to the hard disk 220 beforehand. Hence, if any printer language is selected in the image processing apparatus 10, only the printer language selected by the image processing apparatus 10 can be installed in the information processing apparatus 20 using a common installer.

In the present exemplary embodiment, the function of a printer was selected and described as an example. However, the selectable function is not limited to the function of the printer. For example, it can also be configured such that a scanner function and other functions included in the image processing apparatus 10 are capable of being selected.

Further, in the present exemplary embodiment, the image processing apparatus 10 and the information processing terminal 20 are connected with each other through the USB interface 30, which is an example of a transmission unit. However, the connection is not limited to the USB interface 30. For example, it can also be configured such that the image processing apparatus 10 and the information processing terminal 20 are connected through the network interfaces 40 and 41, where network interface terminal 40 is an example of a second transmission unit. Even if the image processing apparatus 10 and the information processing terminal 20 are connected through the network interfaces 40 and 41, a function of the Plug and Play similar to the one performed in the connection through the USB interface 30 can be realized. Accordingly, by transmitting the Device ID character strings 625, 635, 645 and 725 of the selected printer languages to the information processing terminal 20 through the network interface 40, a suitable driver can be installed in the information processing terminal 20.

Further, it can also be configured such that the printer language is selected from the information processing terminal 20 having the browser through the network 50 by creating the HTML file of a user registration screen in the Web server control section 114.

As one example of a transmission unit, the USB interface 30 was shown. The USB interface 30 transmits plural pieces of identifier information which are used when the device driver is installed to the information processing terminal 20, and correspond to the function of the image processing apparatus 10. Also, as one example of a selection unit, the selection screen of the printer language was shown in FIG. 4A, which is displayed on the display section 107 of the image processing apparatus 10 in the step S301 shown in FIG. 3. The selection unit selects the Device ID character string, which is at least one example of one identifier information, from among the Device ID character strings corresponding to the function of the image processing apparatus 10. Note that the selection in the present exemplary embodiment includes not only a method for selecting a Device ID to be transmitted, but also a method for indirectly selecting the Device ID by selecting the Device ID not to be transmitted. If the unselected Device ID character string is present, the system control section 101 controls the USB interface 30 not to transmit the unselected Device ID character string to the information processing terminal 20.

Other Embodiments

The present invention also encompasses a configuration in which a program code of software to realize the function of the above-described exemplary embodiment is provided to an apparatus connected to various devices, or a computer in a system, in order to operate various devices according to a program stored in the computer (CPU or MPU) of the system or the apparatus.

In this case, the program code itself of the above-described software realizes the function of the above described exemplary embodiment. Accordingly, the program code itself and a unit for providing a computer with the program code, for example, a recording medium that stores such program code, constitute the present invention. As the recording medium for storing such the program code, for example, a flexible disk, a hard disk, an optical disk, a magneto-optical disk, a CD-ROM, a magnetic tape, a non-volatile memory card and a ROM can be used.

Further, the function of the above-described exemplary embodiment is not only realized by executing the program code provided to a computer. If, in cooperation with an OS (operating system) or other application software, the program code running on the computer realizes the exemplary embodiment, such program code is also included in the exemplary embodiment of the present invention.

Furthermore, the present invention also includes the case in which, after the provided program code is stored in a memory included in a function expansion board of a computer or a function expansion unit connected to the computer, a CPU included in the function expansion board or the function expansion unit executes a part or the whole of practical processing based on the command of the program code to realize the function of the above-described exemplary embodiment.

Any of exemplary embodiments described above merely indicate a specific example when implementing the present invention, and the technical scope of the present invention is not limited thereto. That is, a variety of forms can be implemented without departing from the sprit or scope of the present invention.

According to the present exemplary embodiment, one or plural pieces of identifier information to identify one or a plurality of functions designated by a user beforehand are transmitted from the image processing apparatus to the information processing apparatus. The identifier information to identify the function that is not designated by the user beforehand is prohibited from transmitting to the information processing apparatus. Hence, only the identifier information to identify the function designated by the user can be transmitted to the information processing apparatus by one operation. Therefore, when the image processing apparatus and the information processing apparatus are connected with each other, only the necessary function among the plurality of functions included in the image processing apparatus can be automatically set in the information processing apparatus. Accordingly, it is possible to construct a user-friendly environment for the user utilizing the image processing apparatus.

Further, according to other features of the present exemplary embodiment, the driver set including the identifier information and the driver to execute the function identified by the identifier information is stored beforehand for all of functions included in the image processing apparatus. When the image processing apparatus is connected so as to enable communication through the network, the driver which executes the function included in the image processing apparatus, is selected and installed on the basis of the identifier information acquired from the image processing apparatus and the identifier information that is included in the driver set stored beforehand. Accordingly, the driver can be installed using the common installer if any function is designated by a user. Consequently, only the necessary function among a plurality of functions included in the image processing apparatus can automatically be set in the information processing apparatus without using the special installer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-252730 filed Aug. 31, 2005, which is hereby incorporated by reference herein in its entirety.

What is claimed is:

1. An image processing apparatus having a plurality of functions, including a scanner function, a facsimile function, and printer functions based on respective printer languages, and storing plural pieces of identifier information, wherein each respective piece of identifier information corresponds to each respective one of the plurality of functions, the image processing apparatus comprising:

a communication interface configured to connect to an external apparatus including an information processing apparatus to enable communication and automatically execute an installer on the information processing apparatus, wherein the communication interface conforms to Universal Serial Bus (USB) communication standards;

a setting unit configured to, prior to the communication interface connecting the image processing apparatus to the information processing apparatus to automatically execute an installer on the information processing apparatus, set plural pieces of identifier information corresponding to the scanner function and one or more functions selected by a user from a list of the plurality of functions of the image processing apparatus as the one or more function to be used at the information processing apparatus, wherein the list includes the printer functions and does not include the scanner function;

a reception unit configured to, after the communication interface connects the image processing apparatus to the information processing apparatus to automatically execute an installer on the information processing apparatus, receive a request to acquire identifier information from the information processing apparatus via the communication interface; and a transmission unit configured to, in response to the plural pieces of identifier information being set by the setting unit and in response to receiving the request to acquire the identifier information, transmit the plural pieces of identifier information from the image processing apparatus to the information processing apparatus, wherein the transmission unit transmits the plural pieces of identifier information set by the setting unit as description information that is described about a USB logical interface that is separately configured for each function of the plurality of functions, and the identifier information is used for identifying a driver program to be installed by the installer.

2. The image processing apparatus according to claim 1, further comprising:

a display unit configured to display the list of the plurality of functions on a display device of the image processing apparatus.

3. The image processing apparatus according to claim 1, further comprising:

a second transmission unit configured to transmit information to the information processing apparatus such that the list of the plurality of functions is capable of being displayed on a display device of the information processing apparatus, wherein, in response to information of the one or more functions selected from the list by the user is received in the image processing apparatus from the information processing apparatus, the setting unit sets the plural pieces of identifier information corresponding to the one or more functions selected by the user.

4. The image processing apparatus according to claim 1, wherein the transmission unit transmits to the information processing apparatus at least one of the plural pieces of identifier information set by the setting unit in response to receiving the request to acquire the identifier information, and prevents transmitting to the information processing apparatus at least one of the plural pieces of identifier information that is not set by the setting unit.

5. A method for use in an image processing apparatus having a plurality of functions, including a scanner function, a facsimile function, and printer functions based on respective printer languages, and storing plural pieces of identifier information, wherein each respective piece of identifier information corresponds to each respective one of the plurality of functions, the method comprising:

connecting to an external apparatus including an information processing apparatus to enable communication, wherein the communication conforms to Universal Serial Bus (USB) communication standards;

setting, prior to the communication interface connecting the image processing apparatus to the information processing apparatus to automatically execute an installer on the information processing apparatus, plural pieces of identifier information corresponding to the scanner function and one or more functions selected by a user from a list of the plurality of functions of the image processing apparatus as the one or more function to be used at the information processing apparatus, wherein the list includes the printer functions and does not include the scanner function;

receiving, after the communication interface connects the image processing apparatus to the information processing apparatus to automatically execute an installer on the information processing apparatus, a request to acquire identifier information from the information processing apparatus via the communication; and transmitting, in response to the plural pieces of identifier information being set and in response to receiving the request to acquire the identifier information, the plural pieces of identifier information from the image processing apparatus to the information processing apparatus, wherein transmitting further includes transmitting the set plural pieces of identifier information as description information that is described about a USB logical interface that is separately configured for each function of the plurality of functions, and the identifier information is used for identifying a driver program to be installed by the installer.

6. The method according to claim 5, further comprising:
displaying the list of the plurality of functions on a display device of the image processing apparatus.

7. The method according to claim 5, further comprising:
transmitting information to the information processing apparatus such that the list of the plurality of functions is capable of being displayed on a display device of the information processing apparatus, wherein, in response to information of the one or more functions selected from the list by the user is received in the image processing apparatus from the information processing apparatus, setting further includes setting the plural pieces of identifier information corresponding to the one or more functions selected by the user.

8. The method according to claim 5, wherein transmitting further includes transmitting to the information processing apparatus at least one of the set plural pieces of identifier information in response to receiving the request to acquire the identifier information, and preventing the transmission to the information processing apparatus of at least one of the plural pieces of identifier information that is not set.

9. A non-transitory computer-readable storage medium storing a program that causes an image processing apparatus to perform the method according to claim 5.

10. An image processing apparatus that supports a plurality of printer languages and includes a scanner function, a facsimile function, and printer functions, the image processing apparatus comprising:

a communication interface configured to connect to an information processing apparatus to enable communication and automatically execute an installer on the information processing apparatus, wherein the communication interface conforms to Universal Serial Bus (USB) communication standards;

a setting unit configured to, prior to the communication interface connecting the image processing apparatus to the information processing apparatus to automatically execute an installer on the information processing apparatus, set as selected printer languages those printer languages selected by a user from the plurality of printer languages;

a storage unit configured to store printer language information associated with each printer language in the selected printer languages;

a reception unit configured to, after the communication interface connects the image processing apparatus to the information processing apparatus to automatically execute an installer on the information processing apparatus, receive a request for configuration information from the information processing apparatus via the communication interface; and a transmission unit configured to, in response to receiving the request for configuration information, transmit from the image processing apparatus to the information processing apparatus configuration information based on the stored printer language information such that information about only those printer languages set as selected printer languages from the plurality of printer languages are transmitted from the image processing apparatus to the information processing apparatus.

11. The image processing apparatus of claim 10, wherein the setting unit further is configured to, prior to the communication interface connecting the image processing apparatus to the information processing apparatus, exclude from the selected printer languages those printer languages unselected by the user from the plurality of printer languages.

12. The image processing apparatus of claim 10, wherein a storage unit stores a first printer language corresponding to a first printer driver, a second printer language corresponding to a second printer driver, and a printer language corresponding to a facsimile driver, and the setting unit further is configured to, prior to the communication interface connecting the image processing apparatus to the information processing apparatus for a first time, exclude from the selected printer languages, as unselected by the user, one of the first printer language, the second printer language, and the printer language corresponding to a facsimile driver and include in the selected printer languages, as selected by the user, the other two of the first printer language, the second printer language, and the printer language corresponding to a facsimile driver.

13. The image processing apparatus of claim 10, wherein the configuration information transmitted to the information processing apparatus is USB description information and the execution of the installer on the information processing apparatus includes execution of a plug and play function.

14. The image processing apparatus of claim 10, wherein the reception unit further is configured to, after the transmission unit transmits the configuration information to the information processing apparatus, receive a request for device ID information from the information processing apparatus via the communication interface, and wherein the transmission unit further is configured to, in response to receiving the request for device ID information, transmit from the image processing apparatus to the information processing apparatus device ID information after transmitting the configuration information.

15. The image processing apparatus of claim 14, wherein the configuration information includes at least one of a device descriptor, a configuration descriptor, an interface descriptor, and an endpoint descriptor, and wherein the device ID information indicates, with respect to the image processing apparatus, a company name, a model name, a class, and display information.

16. The image processing apparatus of claim 10, wherein a USB logical interface of the communication interface is separated into each of the printer languages transmitted to the information processing apparatus.

\* \* \* \* \*